350-3.77 SR
XR 3,622,988
TX 3048 R

United States Patent

[11] 3,622,988

[72] Inventors Henry John Caulfield
Carlisle;
William T. Maloney, Sudbury, both of Mass.
[21] Appl. No. 859,449
[22] Filed Sept. 19, 1969
[45] Patented Nov. 23, 1971
[73] Assignee Sperry Rand Corporation

[54] OPTICAL CHARACTER RECOGNITION APPARATUS
14 Claims, 8 Drawing Figs.

[52] U.S. Cl. 340/146.3P, 350/3.5
[51] Int. Cl. G06k 9/00
[50] Field of Search 340/146.3 P

[56] References Cited
UNITED STATES PATENTS
3,196,392 7/1965 Horwitz et al. 340/146.3
3,292,148 12/1966 Guiliano et al. 340/146.3
3,437,824 4/1969 Lohmann 340/146.3

*Primary Examiner*—Thomas A. Robinson
*Attorney*—S. C. Yeaton

ABSTRACT: An optical character recognition apparatus comprising a signal processor including a light source and lenses for directing a light beam through both a transparency of the character to be recognized and a holographic plate containing Fourier transform interference patterns representative of the respective characters, the plate being positioned in the frequency plane of the processor. A plurality of photodetectors are positioned in the output plane of the processor at the discrete correlation points of the individual characters. The output signal of each photodetector is weighted and polarized and applied to a plurality of linear summing devices such that the individual summing devices provide a maximum output in response to predetermined characters while the remaining summing devices simultaneously provide output signals of substantially lower magnitude.

3622988
OR IN 340/146.3P

INVENTOR
HENRY JOHN CAULFIELD
William T. Maloney
BY HP Terry
ATTORNEY

INVENTOR
HENRY JOHN CAULFIELD
William T. Maloney
BY HP Terry
ATTORNEY

OPTICAL CHARACTER RECOGNITION APPARATUS

BACKGROUND OF THE INVENTION

1. Field of the Invention

This invention relates to optical character recognition apparatus and more particularly to improvements in such apparatus for enhancing discrimination and reducing sensitivity to character distortion and orientation.

2. Description of the Prior Art

Character recognition performed by means of correlation techniques is based on a comparison of either the character or a transform thereof with a similar previously obtained recording. This is readily accomplished by serially arranging the recording and a transparency of the character to be identified in the path of a light beam propagating therethrough. The optical processor also typically comprises a number of lenses disposed along the light path in prescribed relation to the recording and transparency. For instance, in the case of a spatially coherent processor, that is, one wherein the light beam is derived from a point source thereby enabling phase relations to be determined at various points in the beam at any given instant, one lens is usually positioned between the source and transparency for the purpose of forming a collimated light beam while a second lens is positioned between the transparency and recording such that the transparency is located in the front focal plane (the object plane) of the second lens. This arrangement provides for the formation of the Fourier transform of the transparency in the rear focal plane (the spatial frequency plane) of the second lens. A third lens is generally positioned such that its front focal plane coincides with the spatial frequency plane. This lens operates to form an image of the transparency located in the object plane, the image being formed behind the third lens remote from the spatial frequency plane in the so-called image plane. Correlation of the transparency with a previously made recording can then be performed by locating an appropriate recording in either the spatial frequency or image plane. A recording of the character itself is used for image plane correlation while a Fourier transform recording is used for correlation in the spatial frequency plane. Alternatively, the correlation could be performed simply by positioning the transparency and recording of the character proximate one another in the path of the collimated beam.

In any of the aforementioned systems, correspondence of the transparency and recording is indicated by maximum (in some cases minimum) light transmission through the series combination thereof. For various reasons well known to those skilled in the art, spatial frequency plane correlation is preferred, however, for many applications. Among other factors, it offers the advantage of being insensitive to the vertical and horizontal position of the transparency in the object plane. In addition, it is compatible with matched filter theory which requires the development of the complex conjugate of the input signal for the purpose of maximizing the output signal in the presence of random background noise which is always present in any practical system. Moreover, holographic techniques, as will become apparent from the subsequent description of the preferred embodiment, are advantageously applied to frequency plane correlation. Nevertheless, irrespective of whether the process is coherent or noncoherent or whether the correlation is performed by comparing the characters or transforms of the characters, the discrimination capability of prior art apparatus has frequently been less than desired as a consequence has several shortcomings, namely, inability to distinguish decisively between similarly shaped characters, sensitivity to distortion and orientation of the input transparency and difficulty in repeatably constructing accurate recordings. The present invention is directed to overcoming these problems.

SUMMARY OF THE INVENTION

In a preferred embodiment of the present invention, correlation is performed in the frequency plane by means of a holographic plate containing a plurality of interference patterns representative of the Fourier spectra of the characters to be identified. The holographic plate is arranged in the conventional manner with respect to the light source, lenses and input transparency. A plurality of photodetectors are positioned in the output plane in discrete locations corresponding to the correlation points of the plurality of characters recorded on the holographic plate. The output signals of the plurality of photodetectors are applied to a like plurality of linear algebraic summing devices, each signal being weighted for application to each summing device such that a predetermined summing device provides a maximum output signal indicative of the presence of a given character in the input transparency while simultaneously the output of all the other summing devices is approximately equal to zero or at least substantially reduced from the level of the signals provided by the photodetectors positioned in the output plane. The weight and polarity of the various signals applied to the summing device are calculated from measured values of the photodetector output signals and, as explained hereinafter, the weights can be adjusted for distortion and misalignment of the input characters.

DESCRIPTION OF THE PREFERRED EMBODIMENT

Figure 1:
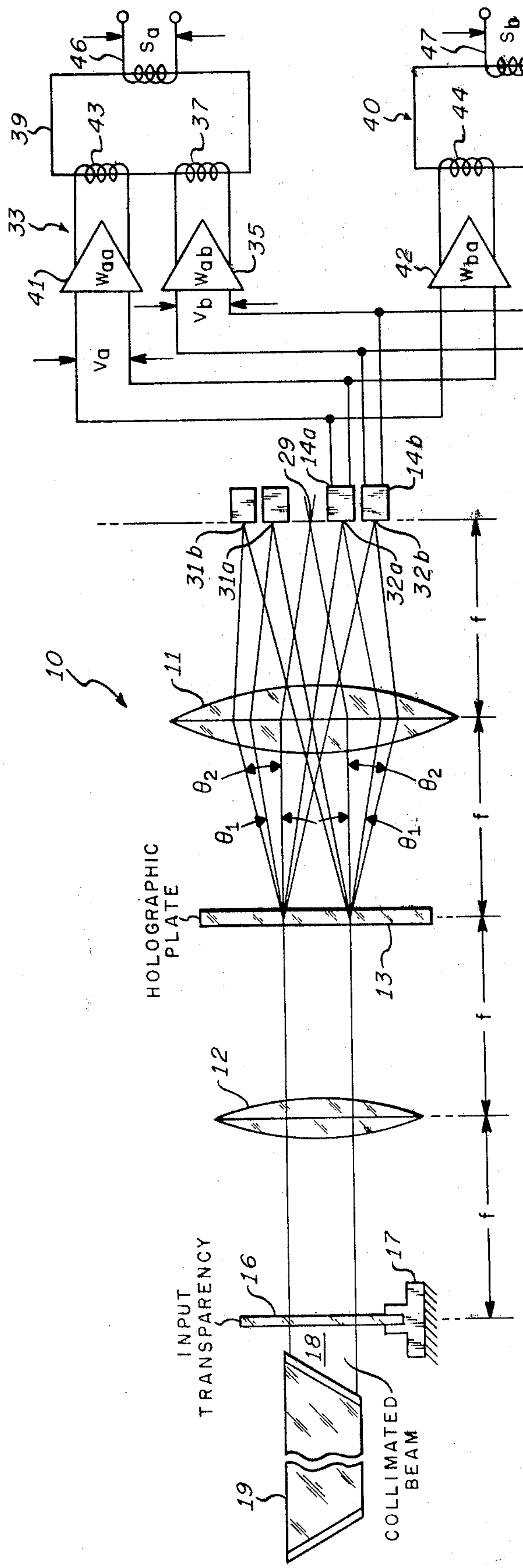
FIG. 1 is a simplified schematic of apparatus embodying the invention.

Referring to FIG. 1, optical correlator 10 comprises lenses 11 and 12, holographic plate 13, photodetectors **14*a* and 14*b* and input transparency 16 supported in member 17 in the path of collimated light beam 18 emitted from light source 19. Lenses 11 and 12 are positioned along the light path such that their front and rear focal planes respectively are in spatial coincidence at the location of holographic plate 13. Transparency 16 containing the character to be identified is preferably located at the front focal plane of lens 12** whereupon an undistorted Fourier transform of the transparency is formed at the location of the holographic plate. As a consequence of this arrangement, the spectrum of the transparency is correlated with the patterns recorded on the hologram as is well known to those skilled in the art. The correlation process being optimized, from the viewpoint of enhancing signal-to-noise ratio in the presence of random background noise, when the holographic pattern is a matched filter of the input transparency spectrum, a matched filter being one having a frequency response function which can be represented mathematically as a complex conjugate of the input frequency spectrum. Such filters are conveniently obtained by means of holographic techniques with the use of an apparatus such as that shown in FIG. 2. Thus, before proceeding with the description of the apparatus of FIG. 1, momentarily consider the method for constructing the holographic filters.

Figure 2:
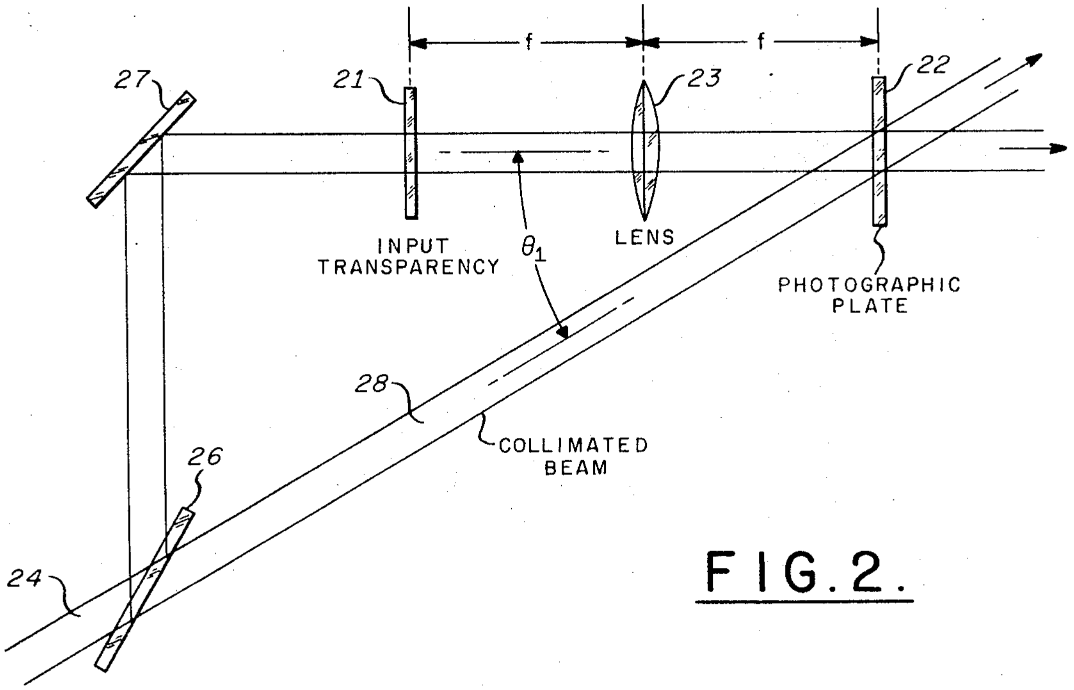
FIG. 2 depicts an apparatus for constructing the hologram used in the apparatus of FIG. 1.

As indicated in FIG. 2, a transparency 21 and a photographic plate 22 are respectively positioned in the front and rear focal planes of a lens 23. A collimated light beam 24 preferably derived from a laser (not shown) is partially reflected from beam splitter 26 on to mirror 27 from which it is reflected through the transparency 21 and lens 23 on to photographic plate 22. The remaining light energy in beam 24 is transmitted through beam splitter 26 as a reference beam 28 which impinges on the photographic plate at an angle $\theta_1$ relative to the central axis of the beam propagating through the lens and transparency. The two beams incident on the plate interfere in the photographic emulsion to produce a holographic pattern representative of the character of the transparency, the latter having been selected from the group of characters that the apparatus is to identify. Then, another transparency containing a second character is inserted in place of transparency 21 and the apparatus is aligned to alter the direction of the reference beam slightly so that it impinges on the photographic plate at an angle $\theta_2$ relative to the central axis of the beam transmitted through the lens and transparency. These two beams incident on the plate also interfere in the photographic emulsion to form a unique pattern representative of the second character in superimposed relationship with the pattern representative of the first character. This procedure is repeated with a new character transparency and a new reference beam angle being used for the recording of each holographic pattern. The individual characters are recorded, of course, utilizing only a fraction of the total exposure range of the photographic plate. For example, if N characters are to be stored, the photographic plate is exposed 1/Nth of its full exposure range for recording each character. As previously mentioned, each holographic interference pattern inherently provides a matched filter of the character transparency used in the recording process and as should be apparent from the foregoing comments, each matched filter pattern is distributed over the two-dimensional area of the photographic plate so that it is multiplexed in a space-sharing manner with all of the other characters comprising the group of characters to be identified.

Returning now to the description of the apparatus of FIG. 1, passage of light beam 18 through the lenses, transparency and holographic plate provides discrete light signals in the rear focal plane of lens 11. The central light signal 29 is unaffected by the holographic plate and therefore does not contain any information relevant to the correlation process. The convolution signals 31*a*, 31*b* and the correlation signals 32*a*, 32*b* on the other hand are affected by the hologram and represent the primary and secondary reconstructed wave fronts respectively of the individual holographic patterns. It will be noted that the correlation and convolution signals are directed to discrete points in accordance with the reference beam angles ($\theta$) used for constructing the hologram, signals 31*a* and 32*a* corresponding to recording angle $\theta_1$ and signals 31*b* and 32*b* corresponding to a slightly larger recording angle $\theta_2$.

Figure 3A:
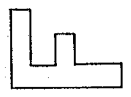
FIGS. 3*a*, 3*b* and 3*c* are illustrative of characters useful for explaining the operation of the FIG. 1 embodiment.
Figure 3B:
Figure 3C:
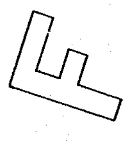

If the transparency contains the character F in an upright position as indicated in FIG. 3*a* and one of the holographic patterns was constructed using the identical character, a correlation signal produced at one of the discrete points in the rear focal plane of lens 11 will be a maximum as a consequence of the Fourier transform of the character F being identically matched to one of the holographic patterns; this is the auto correlation condition. The other holographic patterns will be mismatched with the input character in varying amounts and thereby provide correlation signals of correspondingly reduced amplitudes; these are the cross correlation conditions. From a theoretical standpoint cross correlation will also occur when the holographic pattern of a given character is not exactly the same as the spectra of an input transparency of the same character, but in this instance the cross correlation of the given character with its corresponding mask pattern will still provide a signal of large amplitude at the corresponding photodetector. Obviously, a holographic pattern constructed with a character J or V, which is considerably different from the input character F, will produce comparatively smaller correlation signals whereas a hologram constructed with characters such as E or P, which are rather similar to the input character F, will produce fairly strong correlation signals. In the case of significantly different characters therefore accurate determination of a character is easily attained but for the case of similar looking characters the discrimination capability of the apparatus is seriously degraded. Moreover, this situation is aggravated for conditions where the input characters are distorted or rotated out of alignment with the orientation used during the holographic recording process. For instance, the character P when presented as the input transparency would normally correlate very strongly with the holographic pattern representative of the letter P and rather weakly with the other holograms. If an input character P is distorted, however, as indicated in FIG. 3*b*, it will tend to correlate rather strongly not only with the hologram of character P but also with that corresponding to character F. Likewise, if an input character F is oriented as shown in FIG. 3*c*, it will not correlate with its corresponding hologram as well as the upright F shown in FIG. 3*a* and may simultaneously tend to correlate more readily with the holograms of some other characters. In any event, it should now be apparent that the desired correlation signal in many practical situations will not be of substantially larger magnitude than the other correlation signals and as a result, the discrimination capability of the apparatus will be impaired. Moreover, the optical correlation process generally does not measure up to theoretical expectations because of the difficulty in the present state of the art of constructing repeatably accurate holograms containing complex conjugate spectra of the input characters.

The additional filter means 33 connected to the output terminals of photodetectors 14*a*, 14*b* is provided for the amelioration of the above-mentioned problems. Thus photodetector 14*b* is connected through variable gain amplifiers 35 and 36 to coils 37 and 38 wound on iron cores 39 and 40, respectively. In a similar manner, photodetector 14*a* is connected through variable gain amplifiers 41 and 42 to coils 43 and 44 wound on iron cores 39 and 40. The iron cores and coils connected thereto operate as algebraic summing devices for summing the photodetector output signals in accordance with their magnitudes and polarities (phases) as applied to the cores. Either analog or digital devices can be used for the summing operation but preferably, the summing should be linear, that is, devoid of products, exponentials and other nonlinear terms, although nonlinear summing can also be used if desired. The variable gain amplifiers operate to convert the DC photodetector output signals to AC for summing in the cores and further to enable the photodetector output signals applied to the cores to be weighted in a manner to be described in the following paragraphs.

As hereinbefore explained, an input transparency will correlate with the various patterns recorded on the holographic plate to varying degrees, depending on the condition and orientation of the input character and its similarity to other characters in the group of recorded characters, resulting in signals of differing magnitudes being produced at the respective photodetector outputs. Each photodetector signal is weighted by the variable gain amplifiers to produce one sum signal which is a maximum, thereby indicating the presence of a particular character in the input transparency, while all the other sum signals are made equal to zero. Practical reasons may preclude these other sum signals from actually reducing to zero but they will, nevertheless, be significantly smaller than the signal provided at the related photodetector output. For the purpose of explaining how the weights are determined, however, it is assumed that the predetermined sum signals can actually be reduced to zero. Consider the case of a simple group consisting of only two characters, namely A and B which have been holographically recorded in the aforedescribed manner. The signal at photodetector 14*a* will be designated $V_a$ and that at photodetector 14*b* will be designated $V_b$. Each of these signals is a function of either character A or B depending on which character is present in the input transparency and will be represented as $V_a(A)$ and $V_b(A)$ for the A character and $V_a(B)$ and $V_b(B)$ for the B character. Similarly, the signals at the output coils 46 and 47 of the summing devices will be represented by $S_a$ and $S_b$, respectively. These signals also are functions of the input characters and accordingly will be represented as $S_a(A)$ and $S_b(A)$ for the A character and $S_a(B)$ and $S_b(B)$ for the B character where $S_a$ in each case relates to output coil 46 and $S_b$ likewise relates to output coil 47. In addition, the weights provided by variable gain amplifiers 35, 36, 41 and 42 will be designated as $W_{ab}$, $W_{bb}$, $W_{aa}$ and $W_{ba}$, respectively. The values of these weights are calculated from the measured values of the photodetector output signals obtained with each character present in the input transparency. For example, the signal conditions existing in the apparatus with an A character undistorted and properly oriented in the input transparency can be represented mathematically by $$S_a(A)=W_{aa}V_a(A)+W_{ab}V_b(A) \quad (1)$$

and $$S_b(A)=W_{ba}V_a(A)+W_{bb}V_b(A) \quad (2)$$

If the further assumption is made that $W_{aa}=W_{bb}=$ a constant $=1$, along with the previous assumption that $S_b(A)=0$, equation (2) can be rewritten as $$0=W_{ba}V_a(A)+V_b(A)$$

from which $$W_{ba}=-\frac{V_b(A)}{V_a(A)}$$

indicating that either amplifier 42 must invert the polarity of the signal applied thereto from photodetector 14a or coil 44 must be wound in opposition to coil 38.

For the condition where character B is present at the input transparency, the weights ascribed to the photodetector output signals are selected so that the sum signal at output coil 46, namely $S_a(B)$ is zero, while that at output coil 47, namely $S_b(B)$ is a maximum. Then, the signal conditions can be expressed as $$S_a(B)=W_{aa}V_a(B)+W_{ab}V_b(B) \quad (3)$$

and $$S_b(B)=W_{ba}V_a(B)+W_{bb}V_b(B) \quad (4)$$

From the foregoing assumptions, equation (3) can be rewritten as $$0=V_a(B)+W_{ab}V_b(B)$$

from which $$W_{ab}=-\frac{V_a(B)}{V_b(B)}$$

indicating that either amplifier 35 must invert the polarity of the signal applied thereto from photodetector 14b or coil 37 must be wound in opposition to coil 43. Having determined $W_{ba}$ and $W_{ab}$, $S_a(A)$ and $S_b(B)$ can be ascertained from equations (1) and (4) respectively. Thus, $$S_a(A)=V_a(A)-\frac{V_a(B)}{V_b(B)}\cdot V_b(A)$$

and $$S_b(B)=-\frac{V_b(A)}{V_a(A)}\cdot V_a(B)+V_b(B)$$

These equations indicate that the values $S_a(A)$ and $S_b(B)$ are smaller than the corresponding photodetector output values indicative of the respective characters A and B, namely $V_a(A)$ and $V_b(B)$. In each case, however, the negative expression in the equations will usually be very small since the numerator terms $V_a(B)$ and $V_b(A)$ correspond to the similarity between one character and a hologram of the other, whereas the denominator terms $V_a(A)$ and $V_b(B)$ represent the correlation between each input character and its corresponding holographic pattern. Hence, the signal at output summing coil 46 is clearly indicative of a character A in the input transparency while the signal at output summing coil 47 is likewise indicative of the presence of character B in the input transparency.

It should now be apparent that appropriate weighting of the photodetector output signals will eliminate or at least substantially reduce cross correlation among characters, reduce sensitivity to character distortion and alignment and relax the holographic filter construction tolerances.

The foregoing analysis based on a group consisting of only two characters has been used solely for ease of description. It will be appreciated that the technique for calculating the weights can be extended to any group consisting of a finite number of characters. In general, for N characters, N sets of equations can be generated in the same way the two sets of equations were generated for the group consisting of two characters and from these N sets of equations, N additional sets each including N−1 equations in N−1 unknowns can be derived for simultaneous solution to determine the various weights. Further, the weights can be nonlinear terms, such as exponentials or logarithms to accentuate or deemphasize the photodetector outputs in one way or another to attain desired results.

Figure 4A:
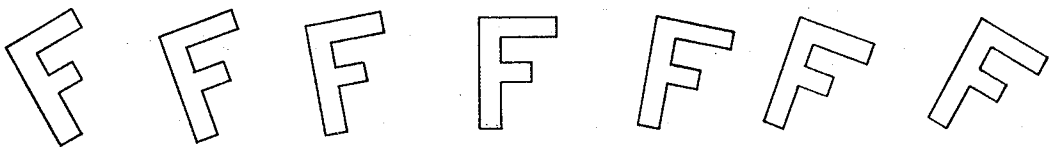
FIGS. 4*a* and 4*b* depict random samples of a given character and the averaged character resulting from such samples.
Figure 4B:
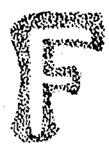

For situations in which the noise differs somewhat from a random distribution, the results may be enhanced by using holographic filters containing patterns different from the previously described matched filters. For instance, if it is known beforehand that the input characters are likely to be distorted or rotated from a prescribed position, better results will generally be obtained by constructing the filters in a manner to maximize the signal-to-noise ratio over a multiplicity of input character samples, rather than maximizing it for the undistorted character alone. Holographic filters having this character can be constructed with the apparatus of FIG. 2 by selecting a number of samples at random and slightly exposing the photographic emulsion to each sample. In the case of character F, for instance, illustrative samples would appear as shown in FIG. 4*a*. In actuality, perhaps as many as 100 samples would be used in which case the emulsion would be exposed to one-hundredth of its 1/Nth exposure range for an application in which N characters are to be recorded. Each sample of a particular character is recorded with the reference beam at the same angle and then the angle is changed to record the next character and so on. Exposure of the photographic plate to the multiplicity of selected samples results in a hologram corresponding to a character F as shown in FIG. 4*b* wherein the clear regions represent the most probable character, that is, an undistorted and properly oriented F, while the darker portions represent regions less likely to be occupied by an input character F.

Figure 5:
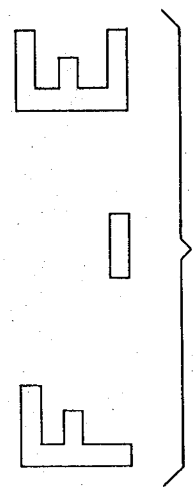
FIG. 5 depicts a group of linearly dependent characters unsuitable for use with the present invention.

The developed photographic plate resulting from the foregoing procedure will constitute an averaged matched filter yielding a better signal-to-noise ratio on the average than a filter matched to an undistorted character. It should be noted that averaging could also be accomplished by using a hologram constructed from a single input character sample and making repetitive weight calculations based on the photodetector signals produced by the response by such a hologram to variously distorted and misaligned input character transparencies. Also, of course, both of the aforedescribed averaging techniques could be combined if so desired. It must be recognized, however, that in those cases where averaging techniques are used, the signals at the output coils of the cross correlation (noncorrelating) summing devices will not be reduced to zero, but in any event will be less than the corresponding photodetector output signals. The essential point is that the additional filtering means 33 can be taught to recognize the characters. The filters (variable gain amplifiers and coils) of the additional filtering means must, however, be linearly independent and must operate on linearly independent characters. The characters shown in FIG. 5, for example, are not linearly independent since the character E is equal to the sum of character F plus the horizontal bar and therefore precludes the cross correlation terms from being set equal to zero.

Although a transparency is shown in the figures and alluded to in the foregoing descriptive material, it should be recognized that the character to be identified can also be presented in other ways, for example as a letter on a printed page or a self-luminous character formed on the screen of a cathode-ray tube. Identification of such characters can be accomplished by forming an image of the character on a medium, such as a photographic glass plate, which is capable of modifying an incident wave front in the same manner as a transparency, or alternatively the optics can be modified so as to use the light coming directly from the character.

While the invention has been described in its preferred embodiments, it is to be understood that the words which have been used are words of description rather than limitation and that changes may be made without departing from the true scope and spirit of the invention in its broader aspects.

We claim:

1. A character recognition apparatus comprising a light source, means adapted to support an input character to be identified in the path of the light beam emitted from said source, mask means positioned to receive the light from said input character, said mask means containing a plurality of masks, each representative of a discrete character to be identified, photodetector means positioned to receive discrete light signals transmitted through said mask means for producing corresponding electrical output signals, each discrete light signal being representative of the degree of similarity between said input character and a respective mask of said plurality of masks, algebraic summing means for performing N summations of the totality of photodetector output signals to provide N sum signals, and means for weighting each photodetector output signal, a prescribed weight being assigned to each photodetector output signal for each summation such that N summations of the one photodetector output signal representative of correspondence between one of said masks and said input character with the total of the other N−1 photodetector output signals, produces one sum signal which is a maximum and N−1 sum signals which are less than the respective photodetector output signals representative of the similarity of the other masks to said input character thereby providing for the difference between said one sum signal and the largest of said N−1 sum signals to be greater than the difference between said one photodetector output signal and any of said other N−1 photodetector output signals.

2. The apparatus of claim 1 wherein said photodetector means comprises a plurality of photodetectors each being located at a predetermined point whereat said discrete light signals are produced.

3. The apparatus of claim 2 wherein the mask means is a holographic plate in which the individual masks are formed by respective interference patterns representative of the characters to be identified.

4. The apparatus of claim 3 wherein the individual masks are multiplexed in a space-sharing manner.

5. The apparatus of claim 2 wherein the summing means comprises a plurality of summing devices and each photodetector is connected to all of said summing devices.

6. The apparatus of claim 5 wherein the weighting means comprises a plurality of elements arranged such that an individual element couples each photodetector to each summing device.

7. The apparatus of claim 1 wherein the input character to be identified is represented by a transparency thereof and the light beam incident on the transparency is collimated and further including lens means positioned between the transparency and mask means such that the mask means is located in the rear focal plane of said lens means, and additional lens means positioned on the other side of said mask means such that the mask means is located in the front focal plane of said additional lens means.

8. The apparatus of claim 7 wherein said photodetector means comprises a plurality of photodetectors each being located at a predetermined point whereat said discrete light signals are produced.

9. The apparatus of claim 8 wherein the mask means is a holographic plate in which the individual masks are formed by respective interference patterns representative of the characters to be identified.

10. The apparatus of claim 9 wherein the individual masks are multiplexed in a space-sharing manner.

11. The apparatus of claim 10 wherein the summing means comprises a plurality of summing devices and each photodetector is connected to all of said summing devices.

12. The apparatus of claim 11 wherein the weighting means comprises a plurality of variable impedance elements arranged such that an individual element couples each photodetector to each summing device.

13. The apparatus of claim 12 wherein the summing devices operate to perform a linear summation.

14. The apparatus of claim 13 further including means for making the signals applied to the summing means alternating in nature.

* * * * *